March 5, 1957  S. J. CHMELA  2,783,812
TIRE CHAIN ASSEMBLY

Filed May 13, 1955  2 Sheets-Sheet 1

Stephen J. Chmela
INVENTOR.

March 5, 1957  S. J. CHMELA  2,783,812
TIRE CHAIN ASSEMBLY
Filed May 13, 1955  2 Sheets-Sheet 2
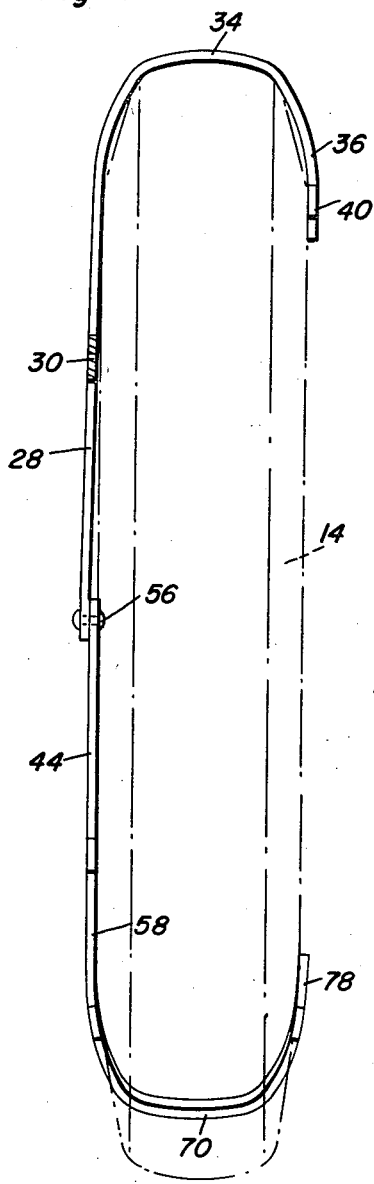
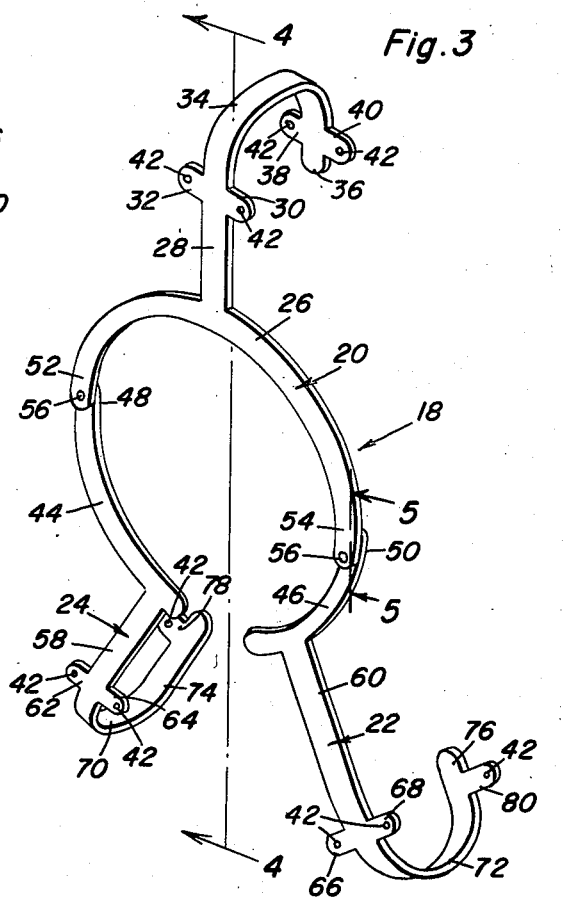
Stephen J. Chmela
INVENTOR.

United States Patent Office 2,783,812
Patented Mar. 5, 1957

2,783,812

TIRE CHAIN ASSEMBLY

Stephen J. Chmela, Marinette, Wis.

Application May 13, 1955, Serial No. 508,243

1 Claim. (Cl. 152—223)

This invention relates generally to devices applied to wheel and tire assemblies for preventing skidding during inclement weather such as icy or snowy conditions, and is more particularly directed to a tire chain assembly which is readily applied on a wheel and tire assembly of a vehicle without requiring jacking up of the vehicle, incorporating no loose parts therein, which is readily applied and highly efficient as well as economical to manufacture.

A principal object of invention in conformance with that set forth above is to provide a segmental chain holding frame which includes a plurality of relatively pivoted segmental parts including hook portions extendable over a tire and wheel assembly wherein the tire chain assembly may be readily mounted in position for use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged perspective view of the chain support frame of the novel tire chain assembly, with the chain elements being removed;

Figure 4 is an enlarged sectional view taken substantially on line 4—4 of Figure 3; and Figure 5 is a further enlarged sectional view taken substantially on line 5—5 of Figure 3 showing the pivotal connection between the ends of the relatively pivotal parts on the chain support frame.

Figure 1:
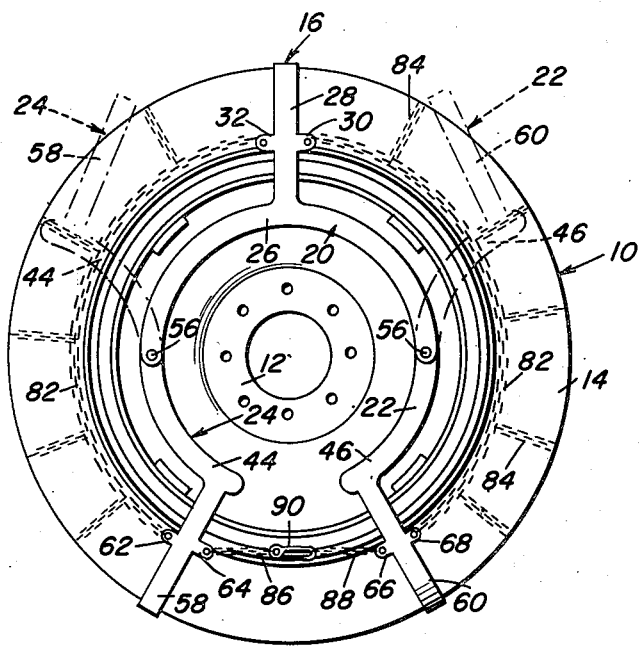
Figure 1 is a side elevational view of a wheel and tire assembly showing the novel tire chain assembly in position thereon, and showing in phantom lines the relative position of the relatively pivotal segmental parts of the chain supporting frame. This view being taken from the outer side of the wheel and tire assembly.

Indicated at 10 is a wheel and tire assembly which includes the wheel 12 having mounted thereon a tire 14 which has secured thereon a tire chain assembly 16.

The tire chain assembly 16 includes a chain support frame 18, see Figure 3, which includes a central frame portion 20 and two end frame portions 22 and 24 pivotally secured to the central frame portion. The central frame portion 20 includes a semi-circular base portion 26 including medially thereof a radially outwardly extending portion 28 having a pair of transversely disposed connecting ear portions 30 and 32 on opposite sides thereof, said portion 28 continuing in a lateral bight portion 34 which terminates in a straight portion 36 forming with the bight portion 34 a hook and which includes a pair of integral transversely extending connecting ears 38 and 40 at opposite sides thereof which are similar to the connecting ears 30 and 32 on the previously mentioned portion 28. The connecting ears 30, 32, 38 and 40 each include extending therethrough suitable apertures 42 to which will be secured the chain elements of the tire chain assembly.

Figure 2:
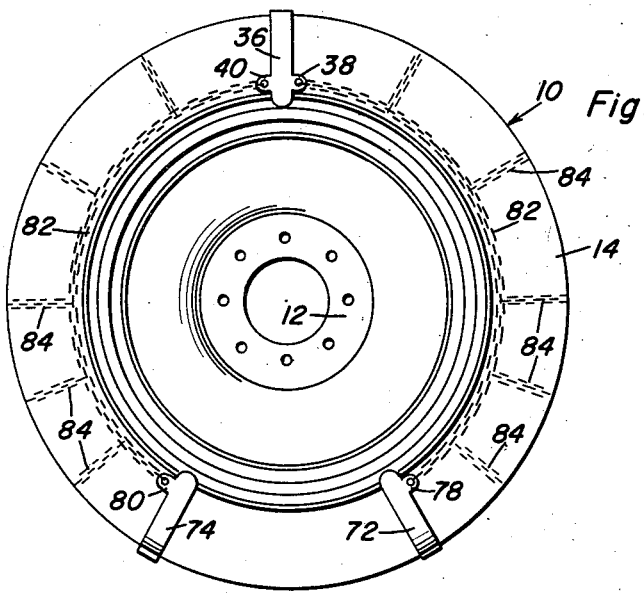
Figure 2 is a side elevational view of the inner side of a wheel and tire assembly looking at the novel tire chain assembly as it appears on the inner side of said wheel and tire assembly.

The two end frame portions 22 and 24 respectively include arcuate base portions 44 and 46 of the same radius as base portion 26 pivotally secured at corresponding ends 48 and 50 to the ends 52 and 54, respectively, of the base portion 26 by means of suitable pivot elements 56, such as rivets flattened on both ends, as seen in Figure 5. The arcuate base portions 44 and 46 include radially outwardly extending portions 58 and 60, respectively, adjacent the other ends thereof and which respectively include transverse connecting ears 62 and 64, and 66 and 68, on opposite sides thereof said portions 58 and 60 each respectively terminating in a laterally extending bight portion 70 and 72 which terminate in a straight portion 74 and 76, respectively, forming with said bight portions 70, 72 hooks, each of said straight portions 74, 76 including a transversely extending connecting ear 78 and 80, said connecting ears extending oppositely from relatively opposite sides of said straight portions 70, 72 for connection to the ears 38, 40. Each of the connecting ears including suitably disposed apertures 42 for the purpose previously mentioned. Connected between the connecting ears 32 and 62, 30 and 68, 40 and 80 and 38 and 78 are equal length chain segments 82 which extend in a parallel relationship on opposite sides of a tire side wall as seen in Figures 1 and 2, said chains 82 having extending between the relatively parallel portions a plurality of transverse friction chain portions 84 which extend transversely to the tread of the tire 14. It is to be understood that the chains 82 are secured in the previously mentioned connecting ears of the chain supporting frame in any suitable manner. Extending between the ears 64 and 66 are chains 86 and 88 secured to the previously mentioned connecting ears, respectively, and being connected together by means of a conventional chain lock 90.

As seen in Figure 1, the central frame portion 20 and the bight portion 34 thereof is extended over the tire 14 whereupon the end frame portions 22 and 24 are pivoted from the phantom line position of Figure 1 and to the position shown by the dotted lines whereupon the chains 82 and 84 will conform to the tire 14, thereafter the chain lines 86 and 88 will be secured by means of the chain lock 90. It is believed readily apparent that the previously mentioned tire chain assembly may be readily and expeditiously applied upon a tire and wheel assembly without jacking up the vehicle upon which the tire and wheel assembly is mounted. The pivotal connections and pivot pins 56 of the central and end frames 20, 22 and 24 permit relative movement of the frame portions when the bight portions 34, 70 and 72 come in contact with the road surface. Also the end frame portions 22, 24 are swingable on the pivot pins 56 toward each other to engage the bight portions 70, 72 over the tire 14 so that the radially outwardly extending portions 28, 22, 24 are disposed radially of a tire, substantially, and the semi-circular and arcuate base portions are swung into substantially concentric formation to tighten the chains 82, 84.

Various positional directional terms such as "front," "side," etc., are utilized herein to have only a relative connotation to aid in describing the device and are not intended to be interpreted as requiring any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A tire chain assembly including a frame adapted to be positioned against one side of an automobile tire and comprising a semi-circular base portion, and a pair of arcuate base portions having corresponding ends pivoted to the ends of the semi-circular base portion, a radially outwardly extending central portion on said semi-circular base portion, a pair of radially outwardly extending portions on said arcuate base portions adjacent the other ends of said arcuate base portions, said radially outwardly extending portions terminating in hooks adapted to engage over a tire, chains connecting the radially outwardly extending portions on one side of the tire, chains connecting the hooks on the other side of the tire, and cross-chains for overlying the tire and connecting the chains on opposite sides of the tire, said pair of arcuate base portions being swingable on their pivoted ends toward each other to correspondingly swing the radially outwardly extending portions thereon for engaging their bight portions over said tire and tightening said chains.

References Cited in the file of this patent

UNITED STATES PATENTS

| | | |
|---|---|---|
| 1,627,806 | Ross | May 10, 1927 |
| 1,727,652 | Leavitt | Sept. 10, 1929 |
| 2,093,404 | Akins | Sept. 21, 1937 |